Figure 1:
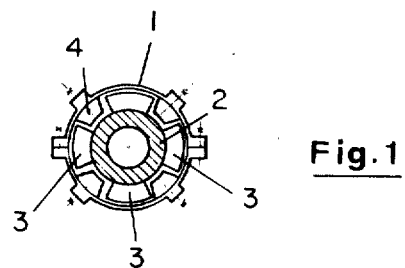

United States Patent

Ronner

[11] 4,004,788
[45] Jan. 25, 1977

[54] MIXING AND KNEADING MACHINE

[75] Inventor: Fritz Ronner, Pratteln, Switzerland

[73] Assignee: BUSS Aktiengesellschaft, Basel, Switzerland

[22] Filed: Oct. 3, 1972

[21] Appl. No.: 294,581

[30] Foreign Application Priority Data

Oct. 28, 1971 Switzerland .......... 15736/71

[52] U.S. Cl. .......................... 259/191
[51] Int. Cl.² .......... B29B 1/04; B29B 1/06
[58] Field of Search .......... 259/9, 10, 7, 106, 109, 259/110, 191, 193, 194; 425/208, 209

[56] References Cited

UNITED STATES PATENTS

| | | | |
|---|---|---|---|
| 3,023,455 | 3/1962 | Geier et al. | 259/9 X |
| 3,253,818 | 5/1966 | Seddon et al. | 259/9 |
| 3,458,894 | 8/1969 | Wheeler | 259/191 |

Primary Examiner—Leonard D. Christian
Assistant Examiner—Alan Cantor

[57] ABSTRACT

A method of increasing the output of a mixing and kneading machine consisting essentially of a casing of fixed length having a screw shaft arranged in the casing and at least four mixing and kneading vanes; the casing being provided with kneading elements equal in number to said vanes and projecting radially inwardly on the inner wall of said casing and means for simultaneously rotating and reciprocating at least once per rotation the screw shaft within said casing; the method steps comprising the steps of doubling or tripling the diameter of the casing while simultaneously increasing the core diameter of said screw by an amount to maintain unchanged the difference between the casing diameter and the diameter of the screw and simultaneously reducing the screw speed about one half or about one third, respectively. In accordance with the method there is provided a number of worm vanes and of kneading elements which is multiplied by about two or about three, respectively, and further increasing the number of axial rotational movements of the screw by at least the same factor as the increase in the screw diameter.

1 Claim, 5 Drawing Figures

MIXING AND KNEADING MACHINE

The present invention relates to a mixing and kneading machine comprising a casing, a screw shaft arranged in said casing, said screw shaft being equipped with mixing and kneading vanes, and said casing being provided with kneading elements projecting radially inwards on the inner wall of the casing, further comprising means for rotating and simultaneously reciprocating said screw shaft within said housing. It is an object of the invention to propose an improved embodiment of a machine as described which is capable of providing several times the output of a given machine. It is a further object of the invention to enable a person skilled in the art to construct a machine with several times the output of a given machine without the need of performing the usually necessary development work.

In recent years machines of the type described have found broad application in many sectors of industry and particularly in the plastics processing industry. But precisely this industry requires even larger machines, because a machine with, say, three times the output costs less and works more economically than do three machines with normal output. Moreover, a machine capable of producing more results in relatively lower labour costs and space requirement.

When the characteristics of a particular machine model, which are determined by the design of the machine and the conditions under which it operates, enable it to perform well for a specific working process or for a more or less broad spectrum of similar working processes, this is often attributable to a development of this machine model over a period of years including a large number of test series required to establish the optimum characteristics. But a proven machine model cannot necessarily be simply dimensionally enlarged in order to obtain a machine with several times the output, because, for example, the peripheral speed of the screw and thus the stressing of the product in the form of increased frictional forces can become excessive. For the same reason, screw speed cannot be raised arbitrarily. Apart from the sensitivity to heat, another important factor is the poor heat conductivity of most of the products to be processed in the machine, e.g. the plastics products, because the product can easily be spoiled by excessive temperature at one particular point while the adjacent location has hardly reached the operating temperature.

To avoid difficulties of this nature, proposals have already been made involving the building of machines as long as thirty times the diameter and more. But for a continuously operating mixing and kneading machine an extension of the housing to lengths of this order is not advisable, since the unequal heat expansion of the screw and housing would jeopardize the proper interaction of the inner housing wall and the kneading elements on the screw, particularly if the inner housing wall is fitted with wiping bolts or tooth-like kneading elements which interact with kneading vanes of the screw.

The purpose of the present invention is to propose a screw-type machine of the type described above which exhibits several times the output in comparison with a given machine without necessitating a fundamental new development of the machine. For a housing of a given length, the invention consists in multiplying the inner diameter of the housing by a certain factor and increasing the core diameter of the screw sufficiently to maintain unchanged the difference between housing diameter and core diameter, furthermore in reducing the screw speed in relation to the original machine by the same factor, and finally in multiplying the number of screw vanes and of kneading or wiping elements by the same factor.

In a machine with rotating and simultaneously reciprocating screw, it is of advantage for the number of axial movements per rotation of the screw to be multiplied by the same factor in relation to the original machine.

Figure 2:
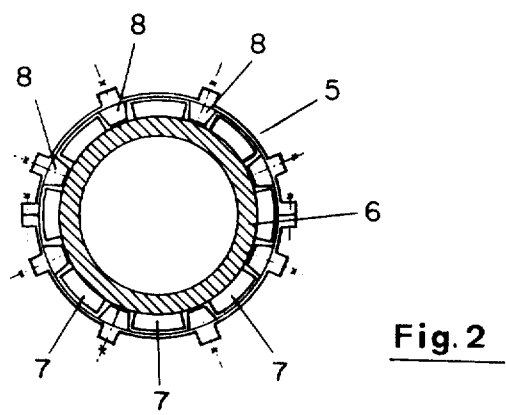
Figure 3:
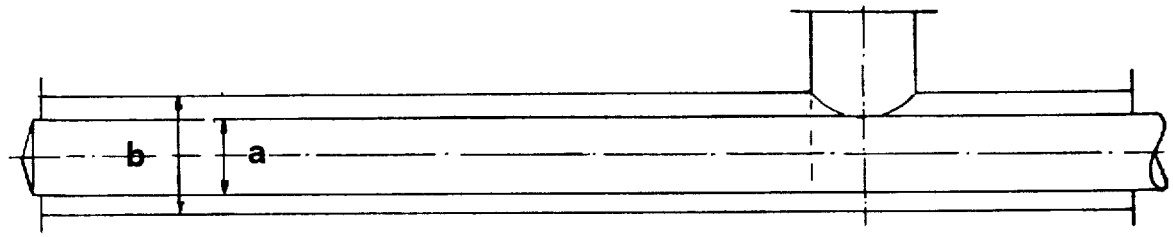
Figure 4:
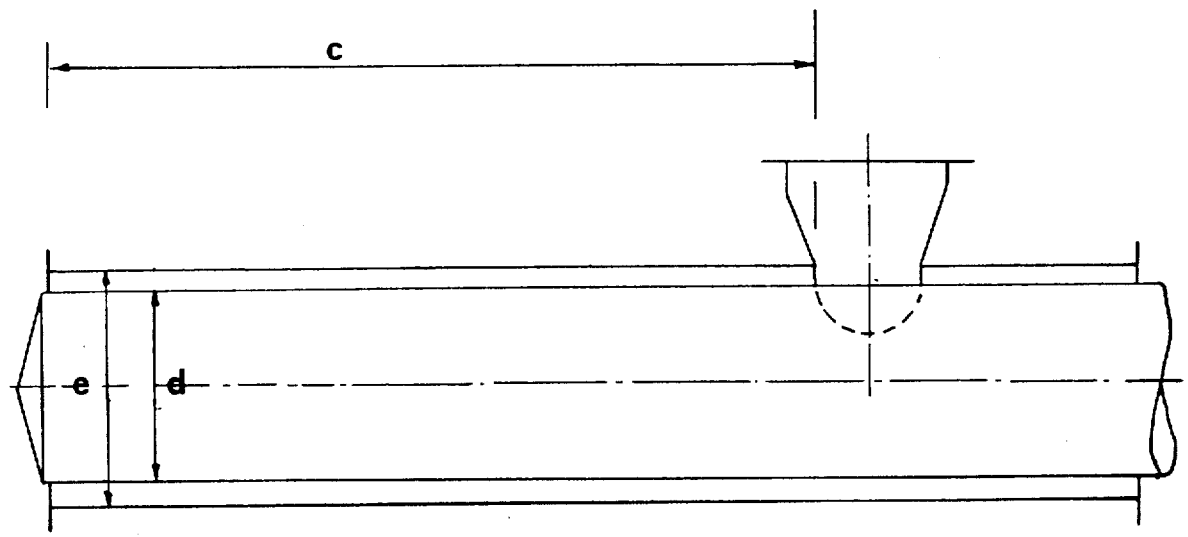
Figure 5:
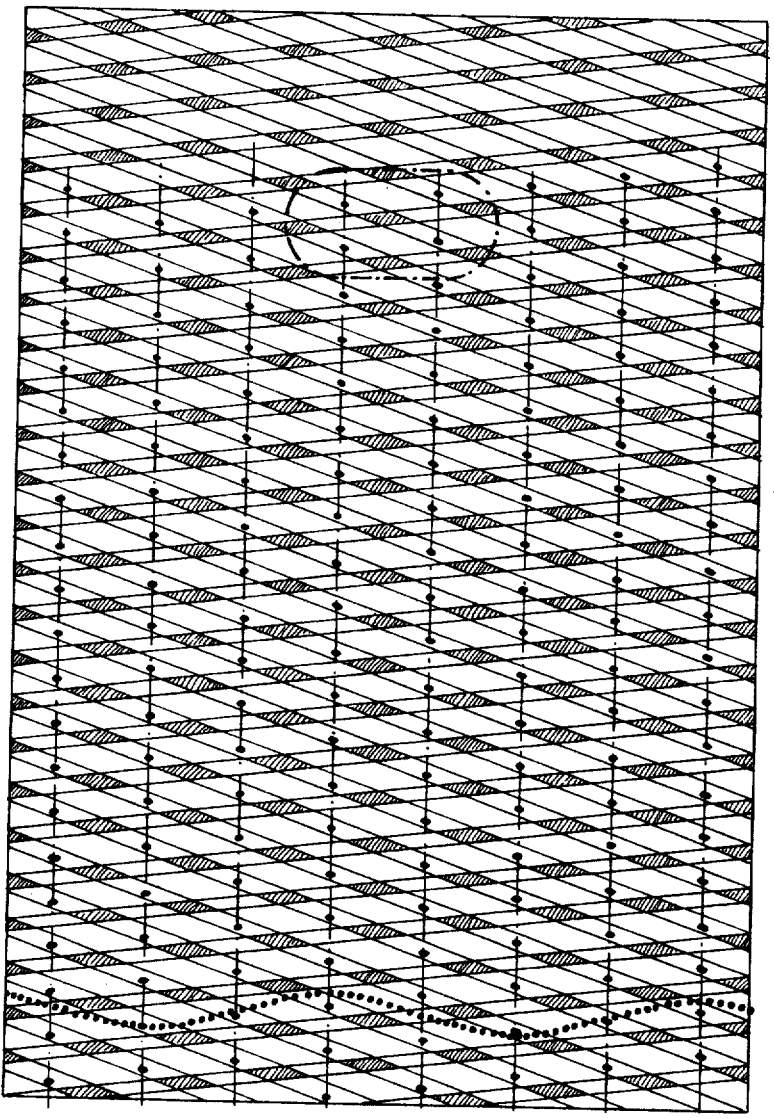

The accompanying drawings show an example of a continuously working mixing and kneading machine, the screw of which describes both rotating and simultaneously reciprocating movements. Shown are:

FIG. 1 diagrammatic cross-section through a given machine,

FIG. 2 diagrammatic cross-section through a machine designed according to the invention with several times the output, FIG. 3 diagrammatic longitudinal section through the machine shown in FIG. 1, FIG. 4 diagrammatic longitudinal section through the machine shown in FIG. 2, and FIG. 5 a development of the kneading screw of the machine shown in FIGS. 2 and 4.

The machine shown in FIG. 1 possesses a housing 1, within which a hollow shaft 2 is supported so that it can be rotated and simultaneously moved back and forth. The shaft 2 is provided with four worm vanes 3 which interact with kneading teeth 4 arranged equidistantly along the periphery of the inner wall of the housing. It can be seen from FIG. 3 that the screw core has a diameter of, for example $a = 130$ mm, the housing an inner diameter of $b = 200$ mm and the machine an effective length of $c = 1390$ mm. Such a machine is operated, for example, with a screw speed of 72 rpm, while the screw describes one back-and-forth movement per rotation.

The machine shown in FIG. 2 also possesses a housing 5, within which the hollow kneading screw 6 is supported so that is can be rotated and moved back and forth. On its periphery, the screw 6 carries spaced worm vanes 7, the number of which has been put at eight. In corresponding fashion, eight kneading teeth 8 have been provided spaced along the periphery of the inner wall of the housing which interact with the worm vanes 7. As can be seen from FIG. 4, the screw core diameter of this machine is $d = 330$ mm, while inner diameter of the housing, $e = 400$ mm, is twice as large as that of the machine shown in FIGS. 1 and 3. The effective machine lenth $c$ is unchanged, hence 1390 mm.

The difference between the diameter $b$ of the housing and the diameter $a$ of the screw core is $200 - 130 = 70$ mm in the first case, and in the second $e - d = 400 - 330 = 70$ mm, hence identical. Since the housing diameter was doubled, the number of worm vanes 7 and kneading teeth 8 are also double. In operation this enlarged machine is run at half speed, i.e., at 36 rpm, but the screw describes two back-and-forth movements per rotation. The surface area of the working space amounts to 181 cm² in the first machine and 402 cm² in the second, i.e., 2.2 times more. Since this surface area is directly proportional to the output rate, the machine calculated according to the proposed method will have more than double the output of the original machine.

The halved screw speed makes the peripheral speed at the kneading teeth identical, so that no increase stressing of the material can occur.

Of course other multiplication factors can be employed than the factor of 2 chosen in the above example. For instance, the core diameter of a machine with 600 mm inner diameter would be 530 mm, while the number of worm vanes and kneading teeth on the periphery would be raised to 12. Such a machine would be operated with a screw speed of 24 rpm and with three back-and-forth movements of the screw per rotation. The resulting surface area of the working space would be 621 cm$^2$, corresponding to an output rate 3.43 times that of the original machine.

A machine calculated according to the proposed method affords design advantages in that the housing offers increased peripheral surface for the accommodation of heating arrangements and kneading teeth. In addition, the relatively sharply increased diameter of the screw core makes the screw considerably more rigid and also provides more space for the accommodation of arrangements for the heating or cooling of the screw. The space requirement of such a machine is increased only slightly, while the relationship between manufacturing cost and output rate is substantially better than that for smaller machines.

What I claim is:

1. A method of increasing the output of a mixing and kneading machine consisting essentially of a casing of fixed length; a screw shaft arranged in said casing; said screw shaft being provided with at least four mixing and kneading vanes; said casing being provided with kneading elements equal in number to said vanes and projecting radially inwardly on the inner wall of said casing; means for simultaneously rotating and reciprocating at least once per rotation said screw shaft within said casing; the method steps comprising the steps of increasing the diameter of the casing by a factor of 2 to 3 while simultaneously increasing the core diameter of said screw by an amount to maintain unchanged the difference between the casing diameter and the diameter of the screw and simultaneously reducing the screw speed by a factor of ½ to ⅓; providing a number of worm vanes and of kneading elements which is increased by a factor of 2 to 3, the increased number of vanes and kneading elements and the increases in the diameter being inversely proportional to the reduction in screw speed and further increasing the number of axial reciprocating movements of the screw by at least the same factor as the increase in the screw diameter.

* * * * *